Figure 1:
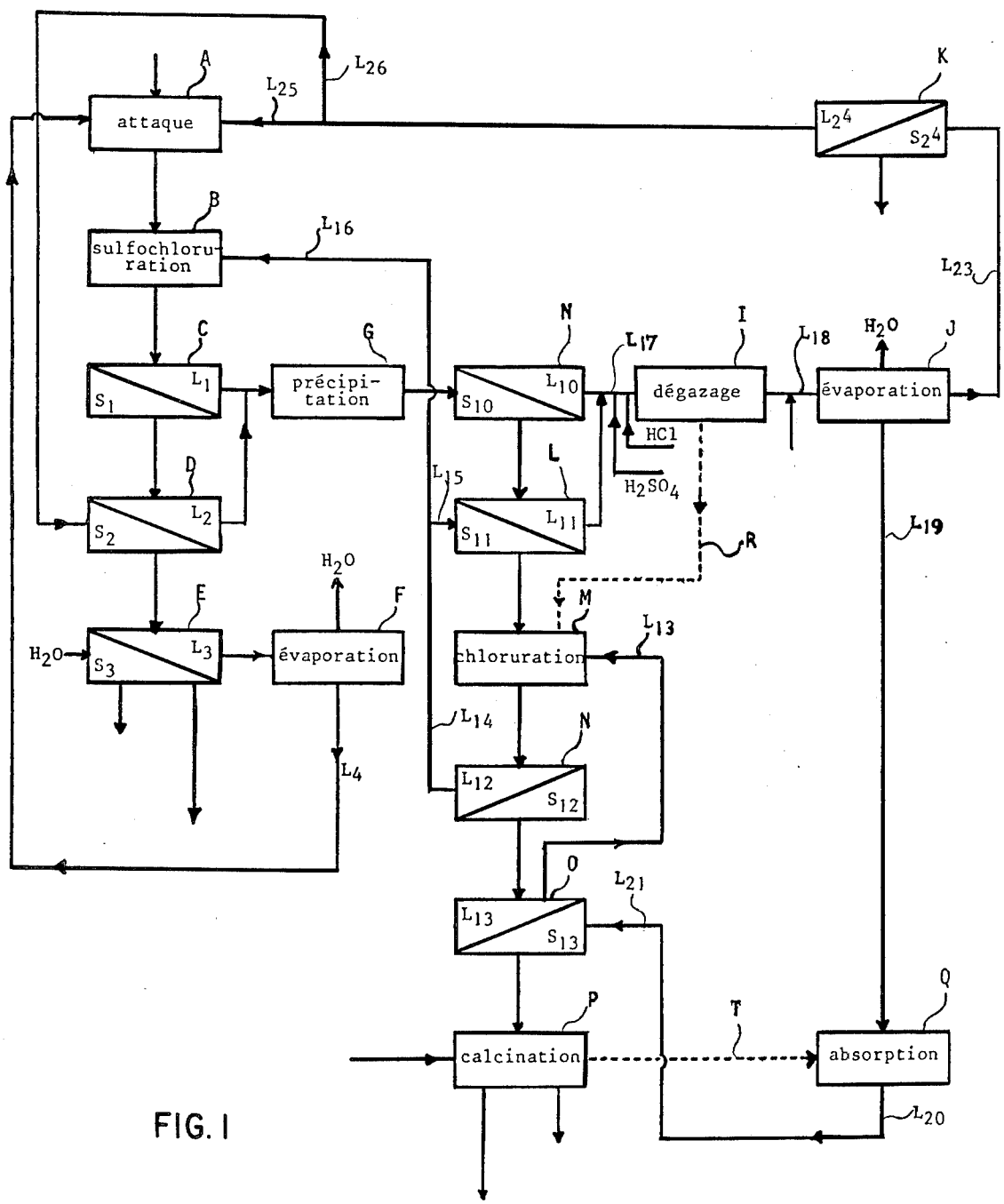

United States Patent [19]

Cohen et al.

[11] 4,124,680
[45] Nov. 7, 1978

[54] METHOD OF OBTAINING PURE ALUMINA BY ACID ATTACK ON ALUMINOUS MINERALS CONTAINING OTHER ELEMENTS

[75] Inventors: Joseph Cohen; Alain Adjemian, both of Aix en Provence, France

[73] Assignee: Aluminum Pechiney, Gardanne, France

[21] Appl. No.: 876,206

[22] Filed: Feb. 9, 1978

[30] Foreign Application Priority Data

Feb. 28, 1977 [FR] France ................................. 77 06530

[51] Int. Cl.$^2$ ............................. C01F 7/22; C01F 7/26
[52] U.S. Cl. ..................................... 423/126; 423/128; 423/132
[58] Field of Search ................ 423/111, 126, 128, 132

[56] References Cited

U.S. PATENT DOCUMENTS

| 2,152,597 | 3/1939 | Luni .................................... 423/132 |
| 3,620,671 | 11/1971 | Maurel et al. ......................... 423/128 |
| 3,862,293 | 1/1975 | Maurel et al. ......................... 423/128 |

FOREIGN PATENT DOCUMENTS

| 574,983 | 2/1924 | France .................................... 423/132 |
| 1,554,586 | 12/1968 | France .................................... 423/126 |
| 44-24883 | 10/1969 | Japan ...................................... 423/132 |
| 284,661 | 10/1928 | United Kingdom ..................... 423/126 |

Primary Examiner—Herbert T. Carter
Attorney, Agent, or Firm—McDougall, Hersh & Scott

[57] ABSTRACT

A method of obtaining alumina of high purity from aluminous mineral containing impurities in which the mineral is attacked with a sulphuric acid liquor followed by separation of a liquid phase from the resulting solid residue comprising (1) mixing the liquid phase with a liquor containing HCl and $H_2SO_4$ at elevated temperature,
(2) cooling the mixture with the precipitation of hydrated aluminum chlorosulphate having the formula $AlSO_4Cl.6-7H_2O$,
(3) separating the precipitate from the remaining liquor which contains the major part of the impurities in solution,
(4) suspending the separated precipitate in a hydrochloric acid liquor,
(5) chlorinating the suspension by introduction of gaseous HCl with precipitation of $AlCl_3.6H_2O$,
(6) separating the precipitated $AlCl_3.6H_2O$, and
(7) pyrolizing the separated precipitate to produce alumina of high purity and gaseous HCl.

14 Claims, 2 Drawing Figures

METHOD OF OBTAINING PURE ALUMINA BY ACID ATTACK ON ALUMINOUS MINERALS CONTAINING OTHER ELEMENTS

The invention relates to a novel method of obtaining pure alumina by sulphuric acid attack on aluminous minerals containing impurities, followed by treatment of the product resulting from attack with liquor containing HCl and $H_2SO_4$ to precipitate a hydrated aluminum chlorosulphate, then by its conversion into a hexahydrated aluminum chloride which is subsequently pyrohydrolized to provide pure alumina.

The invention also relates to the recovery of an appreciable amount of certain elements contained in the mineral, such as iron, titanium and alkali and alkaline-earth metals, with a view to making use of them.

It was proposed many years ago to attack aluminous minerals with sulphuric acid so as to extract pure alumina therefrom. Thus, for example, the Asseev French Pat. No. 574,983 proposes attacking an aluminous mineral with sulphuric acid, treating the resultant solution with hydrochloric acid and thermally decomposing the hexahydrated aluminum chloride thus formed. However, this document gave no details regarding the means to be employed for eliminating impurities that accompany aluminum in minerals, which impurities can differ very greatly from one mineral to another. Furthermore, the method disclosed by this patent did not enable a pure alumina to be obtained on a cyclic basis.

Other more recent publications, such as French Pat. Nos. 1,558,347 and 2,160,743 proposed cyclic sulphuric acid attack methods and described means for eliminating certain impurities and for obtaining a pure alumina of the required metallurgical quality. However, to achieve this result, the acid aluminum sulphate solution which also contained iron, magnesium, alkaline metals, etc., as impurities, was diluted with water or with a hydrochloric solution, cooled to a suitable temperature and saturated with hydrochloric gas so as to cause precipitation of hexahydrated aluminum chloride. The latter, separated from its mother liquor, was then subjected to purification by dissolution and precipitation by saturation of the liquors with gaseous hydrochloric acid, which operation could be repeated several times.

Although these cyclic methods offer several advantages, including those of producing a pure alumina, by continued research in this field, applicants have tried to develop a new method which would be more economical from the standpoint of energy requirements, and to reduce the degassing of hydrochloric acid which consumes a great deal of energy, while obtaining a particularly pure alumina having the required metallurgical qualities. Interestingly and surprisingly, it has been found that it is possible to treat a sulphuric solution of aluminum at atmospheric pressure with a solution containing HCl and $H_2SO_4$ at a temperature lower than but near to boiling temperature without incurring any losses by the release of hydrochloric acid vapors.

In its essentials, the method in accordance with the invention comprises the following steps:

attack on the aluminous mineral, which also contains other constituents, such as iron and titanium, with an aqueous sulphuric solution containing, by weight, between 40 and 60% free sulphuric acid and between 6 and 12% sulphates of the various metals forming the impurities in the treated material and obtained by recycling this solution and leading to a solution, after attack, that is rich in dissolved aluminum sulphate which may have a concentration of as much as 12% by weight of $Al_2O_3$; the suspension resulting from attack is held at a temperature below the boiling temperature during the operation, the duration of which is at least half an hour but does not exceed five hours, mixture of the products of attack with a liquor containing HCl and $H_2SO_4$ recycled at atmospheric pressure and at a temperature of between 80° C. and 90° C., separation of the attack residue which will be impregnated with the mother liquors and a liquor containing HCl and $H_2SO_4$, treatment of this attack residue to extract therefrom the impregnation mother liquors, first by means of a suitable quantity of a recycled sulphuric acid solution still containing a small quantity of alumina, then by means of a quantity of wash water to obtain inert substances, which are eliminated, and a solution which will be treated to extract its useful components therefrom, cooling of the liquor of HCl and $H_2SO_4$ containing alumina and impurities until hydrated aluminum chlorosulphate having the formula $AlSO_4Cl, 6-7H_2O$ is precipitated, separation of the precipitated hydrated aluminum chlorosulphate crystals impregnated with mother liquors from a liquor of HCl and $H_2SO_4$ containing the major part of the impurities, suspending the hydrated aluminum chlorosulphate crystals in a hydrochloric acid liquor, in which liquor said crystals are at least partially dissolved, chlorination of the hydrochloric mixture thus obtained by the injection of gaseous hydrochloric acid which causes precipitation of the hexahydrated aluminum chloride.

separation of the hexahydrated aluminum chloride crystals impregnated with mother liquors and a liquor containing HCl and $H_2SO_4$, washing of these crystals with a hydrochloric liquor, decomposition of the hexahydrated aluminum chloride by heat and recycling of the gaseous effluents, degassing the liquor containing HCl and $H_2SO_4$ separated from the aluminum chlorosulphate containing the impurities so that the recovered hydrochloric acid can be used for the above-mentioned chlorination, concentration by evaporation of the degassed liquor containing HCl and $H_2SO_4$ to eliminate the last traces of hydrochloric acid in the vapor phase and to cause precipitation of the impurities, separation of the above-mentioned precipitated impurities from the sulphuric liquor which is returned to the attack, picking up a fraction of the aqueous hydrochloric acid solution obtained by the above-mentioned concentration so as to absorb the gaseous hydrochloric acid obtained from thermal decomposition of the hexahydrated aluminum chloride, and returning the liquor containing HCl and $H_2SO_4$ separated from the hydrated aluminum chloride, to the first stage of the process so as to treat the product resulting from the attack on the aluminous minerals.

The solution used for attacking the aluminous minerals is constituted by recycled aqueous solutions containing free sulphuric acid, the quantity of which has been adjusted by an addition from an outside source by an amount which compensates losses, plus small amounts of various metallic sulphates which, for each sulphate, is a function of its solubility in such acid solutions.

The attack on the aluminous mineral takes place hot at a temperature below than but near to boiling point, at atmospheric pressure and during a period which may vary between half an hour and five hours.

After the sulphuric attack on the aluminous mineral, the product resulting from attack, comprising a solid phase consisting of inert substances and certain insoluble impurity salts in suspension, as well as a liquid phase, containing aluminum sulphates and other soluble impurities, is treated with a solution containing HCl and $H_2SO_4$ consisting for example of recycled solution obtained mainly as a result of separation of the hexahydrated aluminum chloride from its mother liquor. Then the solid phase is separated from the liquid phase, the latter being formed of a solution containing HCl and $H_2SO_4$ of aluminum and impurities.

In a variant, the solid and liquid phases, resulting from sulphuric attack on the aluminous mineral, are separated, and the liquid phase is then treated with a solution containing HCl and $H_2SO_4$.

After separation, the residue from the attack is treated with a recycled sulphuric acid solution so as to remove the mother liquors. To do this, a fraction of the sulphuric liquor intended to be used for the attack on the mineral may be tapped off prior to the attack. The quantity of this solution is obviously greater than the volume of the mother liquors that are to be entrained. There is thus obtained, on the one hand, a liquor containing dissolved alumina and impurities, which is added to the liquid phase resulting from the attack and, on the other hand, a residue impregnated with a sulphuric solution containing very little alumina.

The liquor resulting from the sulphuric attack on the aluminous mineral, as well as the mother liquors with which the residue from the attack is impregnated, are treated at atmospheric pressure and at a high temperature with a solution containing HCl and $H_2SO_4$ before or after separation of the liquid and solid phases forming the product of the attack.

The liquor containing HCl and $H_2SO_4$ which is then at a temperature of 80° to 90° C. is cooled to a temperature of approximately 40° C. There is thus obtained a crystalline precipitate of an aluminum chlorosulphate having the formula $AlSO_4Cl,6-7H_2O$, which is separated from its mother liquor, a solution of HCl and $H_2SO_4$ containing the major part of the solubilized impurities in the form of titanium sulphate, iron sulphate, etc., as well as a very small quantity of alumina.

The crystals of hydrated aluminum chlorosulphate are brought into suspension in a hydrochloric liquor in which they may be partially dissolved. This mixture is then saturated with HCl by introducing aqueous hydrochloric acid, this causing precipitation of hexahydrated aluminum chloride.

The hydrated aluminum chloride thus obtained and washed with HCl is of great purity. It is calcinated as described in French Pat. No. 1,558,347.

The mother liquor which is obtained from the separation of the aluminum chlorosulphate crystals and which contains most of the titanium, iron, etc. impurities, receives, in the dissolved condition, an addition of sulphuric acid, making up the losses that occur during the treatment cycle, and is then degassed by heating, the gaseous hydrochloric acid obtained being used for chlorination of the aluminum chlorosulphate, whereas the sulphuric liquor obtained is concentrated by evaporation to eliminate water and the last traces of hydrochloric acid. Thereafter the iron, titanium, etc,. impurities are precipitated in the form of sulphates and even as double sulphates, as described in applicants' French patent application No. 75.32,026. The sulphuric acid, from which the major part of the impurities has been removed, is then recycled to the attack. A fraction of this sulphuric liquor can be used for washing the residue resulting from attack.

As has already been stated, the hydrochloric acid solution, obtained from evaporation of the sulphuric liquor, is used for absorbing the gaseous hydrochloric acid produced during thermal decomposition of the hexahydrated aluminum chloride.

The method of the invention is a cyclic one which enables a pure alumina and a mixture of complex salts, mainly containing iron and titanium as well as other impurities, to be isolated. The consumption of reagents is low and is concerned primarily with replacing losses of sulphuric acid and hydrochloric acid, which losses mainly stem from mechanical causes.

Generally, the various operations comprising the method in accordance with the invention can be carried out as a discontinous operation but preferably as a continuous operation. In the particular case of precipitation of the aluminum chlorosulphate, crystallization may be carried out discontinuously, a recycled primer being introduced, whereas if crystallization is continuous, the sediment suffices for this purpose.

The method of the invention can be used in the treatment of natural or synthetic aluminous substances containing impurities; such substances include silico-aluminous minerals such as the kaolins, siliceous bauxites, kaolinic clays, shales which may contain coal, or impure aluminas or aluminum sulphates obtained from primary processes.

Figure 2:
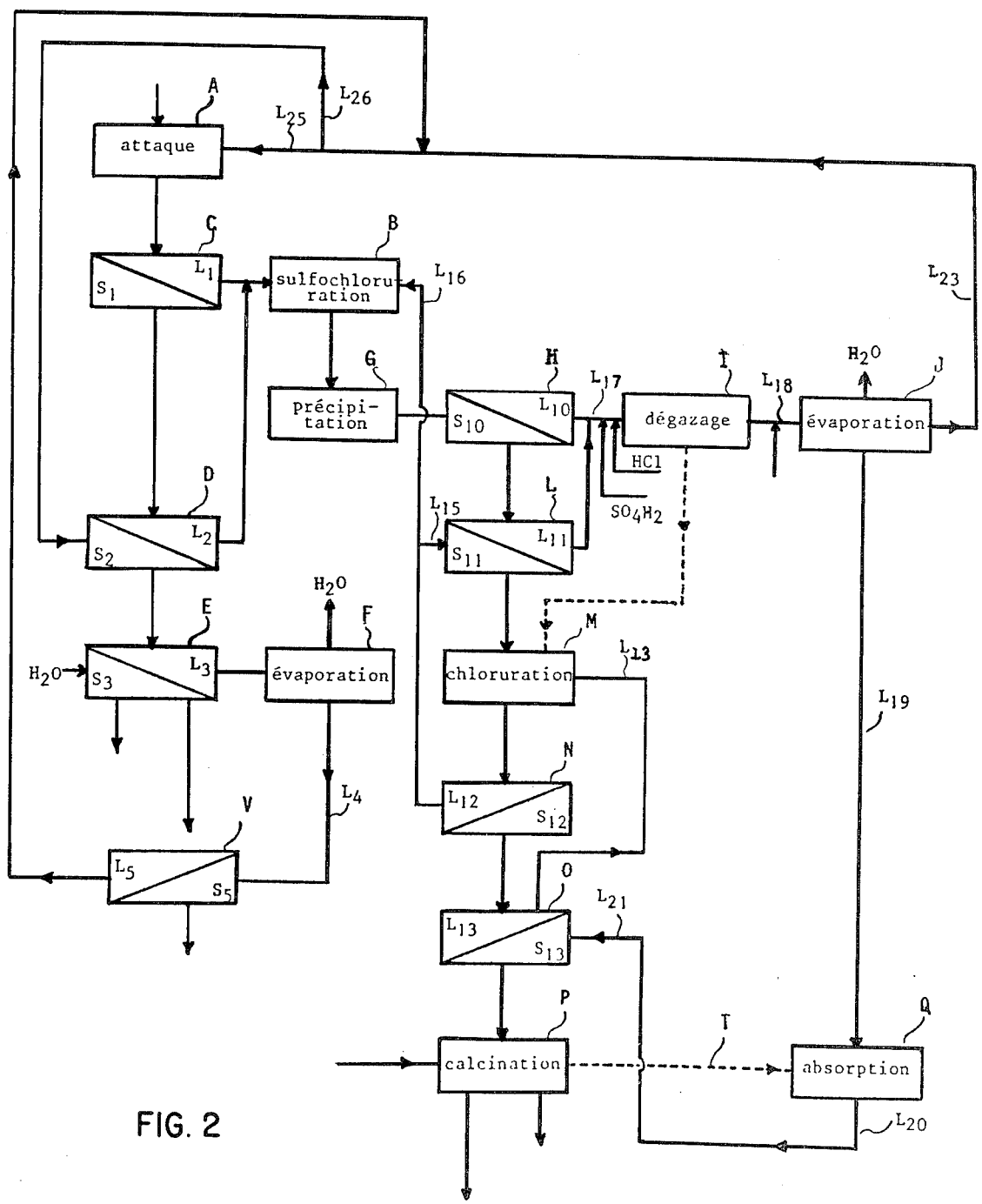

These and other objects and advantages of this invention will hereinafter be described with reference to the accompanying drawings, which are given by way of illustration and not by way of limitation, in which FIGS. 1 and 2 are flow diagrams representative of the practice of the invention.

Referring to FIG. 1, the aluminous mineral and the recycled sulphuric attack liquors L4 and L25 are introduced into the attack reaction vessel (A). The slurry obtained after attack is treated at (B) by a recycled liquor containing HCl and $H_2SO_4$. At (C) a cake $S_1$ and a liquor L1, containing the alumina and certain solubilized impurities, are separated. The mother liquors of the cake $S_1$ are extracted at (D) by means of a fraction L26 of the sulphuric liquor used for attacking the mineral. The mother liquors $L_2$, thus extracted, are mixed with the liquor $L_1$. The resultant cake is then washed with water at (E) to give an inert residue $S_3$, consisting mainly of silica, and a liquor $L_3$, concentrated at (F) by evaporation of part of its water, whereas the sulphuric liquor $L_4$, that is obtained, is recycled to the attack vessel (A).

The liquor, formed by the mixture $L_1$ and $L_2$, is passed to (G) where cooling is carried out to approximately 40° C., thus causing precipitation of hydrated aluminum chlorosulphate having the formula $AlSO_4Cl,6-7H_2O$.

The crystals $S_{10}$ of this chlorosulphate are separated at (H), whereas the mother liquors $L_{10}$, containing in solution impurities such as iron, titanium, etc., are passed to (I).

The crystals $S_{10}$ are carried to (L) where rinsing is carried out by means of a recycled liquor $L_{15}$ containing HCl and $H_2SO_4$. Crystals $S_{11}$, from which the mother liquor $L_{10}$ has been removed, are thus obtained, said liquor, entrained by $L_{15}$, forming a fresh liquor $L_{11}$ of HCl and $H_2SO_4$ containing impurities and united with the liquor $L_{10}$.

The pure crystals of hydrated aluminum chlorosulphate $S_{11}$, impregnated with the rinsing liquor, are carried to (M) where they are brought into suspension in a hydrochloric liquor $L_{13}$ and are then chlorinated by gaseous HCl resulting from degassing at (I).

The product of chlorination is then carried to (N) where the liquor containing HCl and $H_2SO_4$, practically free from impurities $L_{12}$ and recycled towards (B), and crystals $S_{12}$ of hexahydrated aluminum chloride are separated.

The crystals $S_{12}$ are transferred to (O) where they are rinsed with hydrochloric liquor $L_{12}$ to provide pure crystals $S_{13}$ of $Cl_3Al,6H_2O$ and a practically pure liquor $L_{13}$ containing HCl and $H_2SO_4$ which is introduced at (M).

The pure crystals $S_{13}$ of $Cl_3Al,6H_2O$, impregnated with the rinsing liquor, are then calcinated at (P) to provide a pure alumina and a gaseous mixture (T) containing hydrochloric gas and water vapor which are washed and absorbed at (Q).

The liquor $L_{17}$, formed by the mixture of the liquors $L_{10}$ and $L_{11}$ and an addition of sulphuric acid and hydrochloric acid, is introduced at (I) where degassing takes place to give a practical sulphuric liquor $L_{18}$ containing the impurities and gaseous HCl, this liquor being passed through (R) to (M).

The liquor $L_{18}$, to which cations may have been added to permit the formation of complex sulphates sulphates with iron and titanium, is passed to (J) where concentration is carried out by evaporation of water and elimination of the last traces of HCl which may be condensed in the form of a liquor $L_{19}$, used at (Q) for absorbing the gaseous HCl resulting from calcination (P).

The fraction $L_{23}$, issuing from (J), is in fact a slurry containing a solid phase, constituted by the complex sulphates of the impurities to be eliminated and precipitated during evaporation at (J), and a liquid phase which is a sulphuric liquor.

The two phases are then separated at (K) into a cake $S_{24}$, which is a mixture of complex sulphates of iron, titanium, etc., which may serve a useful purpose, and into a liquor $L_{24}$ which is recycled in the direction of the arrow $L_{25}$ to the attack (A) and, in the direction of the arrow 26, to (D), where washing of inert substances is carried out.

Referring to FIG. 2, the attack slurry emanating from (A) is introduced at (C) where the cake $S_1$ is separated from the liquor $L_1$ containing alumina and certain solubilized impurities. The liquor $L_1$ is then carried to (B) by the liquor $L_{16}$ containing HCl and $H_2SO_4$ emanating from (N) and (O).

Since the pickup containing HCl and $H_2SO_4$ is carried out after separation of insoluble substances following attack, the cake $S_1$ is constituted by inert substances and sulphates of impurities insoluble in the liquor after attack, as well as by the mother impregnation liquor. This mother liquor is moved to (D) through $L_{26}$ and provides a cake $S_2$ and a liquor $L_2$ which is united with $L_1$ at (B).

The mixture consisting of the liquors $L_1$ and $L_2$ then undergoes the treatment as described by reference to FIG. 1, this treatment continuing to effect concentration (J) and comprising the various stages involved in obtaining an alumina chlorosulphate, hydrated aluminum chloride and alumina.

The cake $S_2$ is introduced into (E) where the impurities are dissolved and the impregnation liquor is removed by washing with water to give a cake $S_3$, consisting of inert substances impregnated with water, and a liquor $L_3$.

The liquor $L_3$, which contains solubilized sulphates of impurities, is concentrated at (F) by evaporation, and provides a slurry $L_4$, the constituents of which are separated at (V) into a cake $S_5$, containing sulphates of impurities which, extracted at this point of the circuit, may be put to use, in particular by recovery of the sulphuric acid contained therein, and into a liquor $L_5$ which is united with the liquor $L_{23}$.

At (J), the liquor $L_{18}$, which no longer contains the impurities eliminated at (C), is concentrated by evaporating the water and so provides $L_{23}$, and by elimination of the last traces of HCl which may be condensed in the form of a liquor $L_{19}$.

The sulphuric liquor $L_{23}$ is united with $L_5$ to give $L_{24}$, $L_{25}$ and $L_{26}$.

EXAMPLE 1

(Illustrated by FIG. 1)

The method of the invention was used for treating a kaolin having the following composition in percent by weight:
  $Al_2O_3$: 28.20%
  $Fe_2O_3$: 0.79%
  $TiO_2$: 1.81% $SiO_2$: and various 40.00% moisture water 19.30% Component water of the mineral 9.90%

4,034 kg of this mineral were put at (A) into 8,943.30 kg of a hot sulphuric solution ($L_{25} + L_4$) containing by weight:
  67.90% total sulphuric acid, 54% being free,
  1.80% $Al_2O_3$ being in the form of a sulphate,
  0.05% $TiO_2$ being in the form of a sulphate, 3.00% $NH_3$ being in the form of a sulphate,
  27.25% water.

The slurry obtained after attack was transferred from one vessel to another and then treated at (B) with 9,486 kg of a chlorosulphonic liquor (liquor containing HCl and $H_2SO_4$) (L16) containing by weight:
  $Al_2O_3$: 0.50%
  $Fe_2O_3$: 0.06% $TiO_2$: 0.04% $H_2SO_4$: total 21.50% HCl: 22.70% $H_2O$: 55.20%

The chlorosulphonic slurry at a temperature of 80° C. to 90° C. was then passed to (C) where the solid phase $S_1$ was separated from the liquid phase $L_1$ containing alumina and certain solubilized impurities.

The cake S1 was then rinsed at (D) with 5,000 kg of a fraction $L_{26}$ of the sulphuric liquor used for attacking the mineral and having the following composition by weight:
  $Al_2O_3$: 1.80% being in the form of a sulphate
  $TiO_2$: 0.05% being in the form of a sulphate
  $NH_3$: 3.00% being in the form of a sulphate
  $H_2SO_4$: total 67.90%
  $H_2SO_4$ free: 54.00%
  $H_2O$: 27.25%

The mother liquors from the cake $S_1$ were thus extracted therefrom and then united with the chlorosulphonic liquor $L_1$ emerging from (C).

The cake $S_2$, which had undergone this first rinsing, was introduced into (E) where it was washed with water to give a liquor $L_3$ having a mass of 4,722.20 kg and an inert residue $S_3$, the dry weight of which would be 1,996 kg, and the residual liquor from which, representing the deficiency from washing, weighed 277.80 kg.

The residue $S_3$ in the dry state represents a mass of 1,996 kg and had the following composition by weight:
$Al_2O_3$: 5.70%
$Fe_2O_3$: 0.30%
$TiO_2$: 3.30%
$SiO_2$ and various: 80.70%
$H_2O$ of constitution: 10.00%

The liquor $L_3$ was then introduced into (F) where it was concentrated by evaporation, to remove 1,500 kg of water and yielding 3,222.20 kg of a liquor $L_4$ recycled to the attack on the mineral, as previously described.

The liquor constituted by the mixture of $L_1$ and $L_2$ which had a mass of 21,967.10 kg was passed to (G) where cooling to 40° C. was carried out to cause precipitation of hydrated aluminum chlorosulphate.

After precipitation, the suspension of aluminum chlorosulphate crystals in the mother liquors was transferred from one vessel to another at (H) where a cake $S_{10}$, having a dry mass of 5,911.90 kg was separated from a mother liquor $L_{10}$ containing in solution impurities, such as iron and titanium and representing a mass of 16,055.20 kg.

The crystals from $S_{10}$ were rinsed at (L) with 3,707 kg of a recycling liquor $L_{15}$ having the same composition as the above-mentioned liquor $L_{16}$.

After rinsing, pure crystals of hydrated aluminum chlorosulphate were obtained, these forming a cake $S_{11}$ which in the dry state had the following composition by weight:
$Al_2O_3$: 17.90%
$Fe_2O_3$: 0.10%
$TiO_2$: 0.06%
$H_2SO_4$: 34.50%
HCl: 12.80%
$H_2O$: 34.60%

Transferred from one vessel to another at (M), the crystals forming the cake $S_{11}$ were brought into suspension in 8,895 kg of a hydrochloric solution $L_{13}$ having the following composition by weight:
$Al_2O_3$: 0.68%
$Fe_2O_3$: 0.01%
$H_2SO_4$: 3.90%
HCl: 30.70%
$H_2O$: 64.70
and were then subjected to chlorination by introducing 1,311.90 kg of gaseous HCl resulting from degassing (I).

The chlorination product was moved to (N) where separation was carried out of, on the one hand, the containing HCl and $H_2SO_4$ liquor $L_{12}$ having a mass of 13,193 kg, 3,707 kg of which were used for the rinsing operation at (L) and 9,486 kg were effectively recycled to (B), and, on the other hand, of crystals $S_{12}$ of hydrated aluminum chloride.

The crystals $S_{12}$ were then moved to (O) where they were rinsed with 7,888 kg of a liquor $L_{21}$ containing 32% by weight HCl, and this yielded 5,626.20 kg of crystals $S_{13}$ of impregnated $Cl_3Al,6H_2O$ and 8,895 kg of the previously mentioned liquor $L_{13}$. The pure crystals $S_{13}$ were than calcinated at (P) and yielded 1,000 kg of pure alumina and 5,017.20 kg of a vapor consisting of HCl and water, but a loss of 40 kg was recorded during calcination and the introduction of 431 kg of water with the fuel.

The HCl and water vapors issuing from (P) were washed and condensed at (Q).

To make up for the losses, 57.10 kg of 35% hydrochloric solution and 359.40 kg of sulphuric solution at 96% $H_2SO_4$ was added to the mother liquor $L_{10}$ which was united with the rinsing liquor $L_{12}$ also acquired. This mixture, having a mass of 16,471.20 kg, formed the liquor $L_{17}$ introduced at (I) where degassing was carried out to yield 1,311.90 kg of gaseous HCl piped through (R) to (M), and 15,159.80 kg of practically sulphuric liquor still containing impurities which were eliminated by using the treatment described in applicants' French patent application No. 75.32,026 of Oct. 20, 1975. Following this treatment, 83.80 kg of $(NH_4)_2SO_4$ were added to the above mentioned sulphuric liquor thus yielding 15,243.60 kg of a liquor $L_{18}$ having the following composition by weight:
$Al_2O_3$: 1.33%
$Fe_2O_3$: 0.17%
$TiO_2$: 0.08%
$NH_3$: 2.20%
HCl: 0.70%
$H_2O$: 46.32%
$H_2SO_4$: total 49.20%

The liquor $L_{18}$ was moved to (J) where concentration was carried out by evaporation of 1,329.90 kg of water and where the last traces of HCl were eliminated in the form of 2,870.90 kg of a solution $L_{19}$ at 3.60% of this acid which was passed to (Q) for the purpose of absorbing the gaseous HCl resulting from calcination (P).

The fraction $L_{23}$ issuing from (J) represented a mass of 11,042.80 kg constituted by a solid phase in suspension in the liquid phase. When introduced into (K), this fraction $L_{23}$ yielded 321.60 kg of a cake $S_{24}$, and 10,721.20 kg of a sulphuric liquor $L_{24}$.

The cake $S_{24}$ consisted of complex sulphates of impurities to be eliminated and precipitated at the time of the evaporation operation at (J), this cake having the following composition by weight:
$Al_2O_3$: 3.10%
$Fe_2O_3$: 8.08%
$TiO_2$: 2.15%
$NH_3$: 4.14%
$H_2SO_4$: 68.00%
$H_2O$: 14.53%

The liquor $L_{24}$, which was recycled in the direction $L_{25}$ to the attack (A) and in the direction $L_{26}$ for washing out (D) inert substances, had the following composition by weight:
$Al_2O_3$: 1.80%
$TiO_2$: 0.05%
$NH_3$: 3.00%
$H_2SO_4$: free 54.00%
$H_2SO_4$: total 67.90%
$H_2O$: 27.25%

The alumina obtained was extremely pure and its analysis showed that the rare impurities present therein occurred in quantities, expressed in p.p.m., that were lower than those generally recorded in aluminas obtained by the large-scale industrial processes:
Fe < 10 p.p.m.
Si < 60 p.p.m.
Ti < 20 p.p.m.
K < 50 p.p.m.
Na < 20 p.p.m.

EXAMPLE 2

(Illustrated by FIG. 2)

The method of the invention was used for treating a calcinated coal-containing shale having the following composition by weight in the dry state:
- $Al_2O_3$: 26.91%
- $SiO_2$: 55.05%
- $Fe_2O_3$: 7.21%
- $TiO_2$: 1.01%
- $Na_2O$: 0.25%
- $K_2O$: 4.00%
- $MgO$: 1.91%
- $CaO$: 0.54%
- $P_2O_5$: 0.20%
- $V_2O_5$: 0.04%
- $H_2O$: 1.21%
- Various 1.66%

4,452 kg of this calcinated and crushed mineral were put at (A) into 12,112 kg of a hot sulphuric solution $L_{25}$ containing by weight:
- 60.80% of total sulphuric acid, of which 51.80% were free
- 1.50% $Al_2O_3$ being in the form of a sulphate
- 0.10% $Fe_2O_3$ being in the form of a sulphate
- 0.01% $TiO_2$ being in the form of a sulphate
- 1.09% $Na_2O$ being in the form of a sulphate
- 0.80% $K_2O$ being in the form of a sulphate
- 0.75% $MgO$ being in the form of a sulphate
- 0.20% $P_2O_5$
- 0.08% $V_2O_5$
- 34.67% water The slurry obtained from the attack at (A), which was at a temperature of between 120° and 125° C., was piped to (C) where the solid phase $S_1$ was separated from the liquid phase $L_1$ containing alumina.

The cake $S_1$ was washed at (D) with 8,942 kg of a fraction $L_{26}$ of the sulphuric liquor intended for attacking the mineral, which liquor was of identical composition to that of $L_{25}$.

The mother liquors contained in the cake $S_1$ were thus extracted and united with the sulphuric liquor $L_1$ issuing from (C).

Thus, the mixture of the liquors $L_1$ and $L_2$ represented a weight of 15,048 kg which was introduced into (B) with liquor containing HCl and $H_2SO_4$.

The cake $S_2$ that had undergone this first rinsing was introduced into (E) where it was washed with 6,000 kg of water which resulted in an inert residue $S_3$, the dry weight of which would have been 2,888 kg and the residual liquor from which, representing the washing deficiency, weighed 136 kg.

The residue $S_3$ represented, in the dry state, a mass of 2,888 kg and had the following composition by weight:
- $Al_2O_3$: 5.40%
- $Fe_2O_3$: 0.90%
- $TiO_2$: 1.385%
- $Na_2O$: 0.034%
- $K_2O$: 0.415%
- $MgO$: 0.73%
- $P_2O_5$: 0.21%
- $H_2SO_4$: total 1.385%
- $CaO$: 0.83%
- $SiO_2$: 84.87%
- $H_2O$: 3.77%
- Various 0.071%

The liquor $L_3$ emerging from (E) representing a mass of 13,434 kg, was introduced into (F) where it underwent concentration by evaporation to remove 3,795 kg of water and yielding a slurry $L_4$ having a mass of 9,639 kg.

The slurry $L_4$ was introduced into (V) where the solid phase $S_5$ was separated from the liquid phase $L_5$.

The impregnated solid phase representing a mass of 2,595 kg, had the following composition by weight, in the dry state:
- $Al_2O_3$: 1.19%
- $Fe_2O_3$: 11.25%
- $TiO_2$: 0.19%
- $Na_2O$: 0.383%
- $K_2O$: 6.32%
- $MgO$: 2.39%
- $P_2O_5$: 0.12%
- $V_2O_5$: 0.077%
- $H_2SO_4$: 58.54%
- $H_2O$: 16.80%
- Various: 2.74%

The liquid phase $L_5$, which represented a mass of 7,044 kg and had a composition practically identical to that of the liquor $L_{25}$, was then recycled to the attack.

The hot mixture of the liquors $L_1$ and $L_2$ representing a mass of 15,048 kg, was piped to (B) where it was treated with 8,092 kg of the chlorosulphonic liquor (containing HCl and $H_2SO_4$) $L_{16}$ containing by weight:
- $Al_2O_3$: 0.25%
- $H_2SO_4$: 21.28%
- HCl: 22.78%
- $H_2O$: 55.69%

The hot liquor, constituted by the mixture of the liquors $L_1$, $L_2$ and $L_{16}$, was piped to (G) where cooling was carried out to approximately 40° C., thus causing precipitation of hydrated aluminum chlorosulphate.

After precipitation, the suspension of aluminum chlorosulphate crystals was transferred from one vessel to another at (H) where a cake $S_{10}$, having a mass of 9,472 kg, was separated from a liquor $L_{10}$, having a mass of 13,668 kg.

The crystals of $S_{10}$ were rinsed at (L) with 3,707 kg of the liquor $L_{15}$ having the same composition as the liquor $L_{16}$.

Following this rinsing, there were obtained pure crystals of hydrated aluminum chlorosulphate forming a cake $S_{11}$ which represented a mass of 8,236 kg and had the following composition by weight:
- $Al_2O_3$: 12.61%
- $H_2SO_4$: 30.49%
- HCl: 15.81%
- $H_2O$: 41.09%

The liquor $L_{11}$, containing the impregnation mother liquors of the cake $S_{10}$, was recycled downstream of (H) and mixed with the liquor $L_{10}$.

The crystals composing the cake $S_{11}$ were transferred from one vessel to another at (M) where they were brought into suspension in 8,896 kg of an essentially hydrochloric solution and were then chlorinated by the introduction of 1,300 kg of gaseous HCl resulting from the degassification (I).

The product of chlorination was then passed to (N) where the chlorosulphonic liquor ($L_{12}$), representing a mass of 11,799 kg recycled to (B) and (L), was separated from a cake $S_{12}$ consisting of 6,633 kg of impregnated hexahydrated aluminum chloride.

The cake $S_{12}$ was then transferred to (O) where it was rinsed with 7,763 kg of a hydrochloric liquor at 33% HCl and was separated to yield 5,500 kg of pure crystals $S_{13}$ of $Cl_3Al6H_2O$ and 8,896 kg of the previously mentioned essentially hydrochloric liquor which had the following composition by weight:

$Al_2O_3$: 1.89%
$H_2SO_4$: 5.91%
HCl: 30.60%
$H_2O$: 61.60%

The pure crystals $S_{13}$ of $AlCl_3.6H_2O$ were then calcinated at (P) and yielded 1,000 kg of pure alumina and 4,891 kg of HCl vapor and water vapor which were washed and condensed at (Q), a loss of approximately 40 kg being recorded however during calcination and the introduction of 430 kg of water with the fuel.

To the mixture of the liquors $L_{10}$ and $L_{11}$, addition was made of 57 kg of 35% HCl solution and 1,673 kg of 96% $H_2SO_4$ solution to make up the losses, and this mixture, representing a mass of 20,341 kg, formed the liquor $L_{17}$ introduced at (I) where degassing was carried out to give 1,300 kg of gaseous HCl which was piped through (R) to (M), and 19,041 kg of a practically sulphuric liquor $L_{18}$.

The liquor $L_{18}$ was passed to (J) where concentration was carried out by evaporating 2,159 kg of water, and where the elimination took place of the last traces of HCl in the form of 2,872 kg of a solution $L_{19}$ at 3.69% of HCl which was passed to (Q) for the purpose of absorbing the gaseous HCl resulting from calcination (P).

The liquor $L_{23}$ issuing from (J) represented a mass of 14,010 kg and was recycled to the attack through $L_{25}$, and to (D) through $L_{26}$.

The alumina obtained in this way was of very great purity. Its analysis showed that the rare impurities present were in a smaller amount than those generally found in aluminas obtained by the large-scale industrial processes:

Fe < 5 p.p.m.
Si < 80 p.p.m.
Ti < 5 p.p.m.
K < 60 p.p.m.
Na < 20 p.p.m.
Mg < 20 p.p.m.
V < 5 p.p.m.
Ca < 10 p.p.m.

We claim:

1. A method of obtaining alumina of high purity from aluminous mineral containing impurities in which the mineral is attacked with a sulphuric acid liquor followed by separation of a liquid phase from the resulting solid residue comprising
   (1) mixing the liquid phase with a liquor containing HCl and $H_2SO_4$ at elevated temperature,
   (2) cooling the mixture with the precipitation of hydrated aluminum chlorosulphate having the formula $AlSO_4Cl.6-7H_2O$,
   (3) separating the precipitate from the remaining liquor which contains the major part of the impurities in solution,
   (4) suspending the separated precipitate in a hydrochloric acid liquor,
   (5) chlorinating the suspension by introduction of gaseous HCl with precipitation of $AlCl_3.6H_2O$,
   (6) separating the precipitated $AlCl_3.6H_2O$, and
   (7) pyrolizing the separated precipitate to produce alumina of high purity and gaseous HCl.

2. The method as claimed in claim 1 in which the impurities are metaliferous compounds of iron, titanium, alkali and alkaline earth metals.

3. The method as claimed in claim 1 which includes the step of washing the separated precipitate of step (3) with aqueous medium.

4. The method as claimed in claim 1 which includes the step of degassing the liquor from step (3) to yield HCl and introducing the HCl in the chlorination of step (5).

5. The method as claimed in claim 4 which includes the step of concentrating the degassed liquor.

6. The method as claimed in claim 5 which includes the step of freeing the concentrate from impurities and recycling the purified liquor to the attack of the aluminous mineral.

7. The method as claimed in claim 4 which includes the step of condensing the vapor and gaseous HCl given off.

8. The method as claimed in claim 1 which includes the step of absorbing the gaseous HCl from the pyrolysis of step (7) in the concentrate of claim 7.

9. The method as claimed in claim 1 which includes the step of cycling the mother liquor separated from the precipitate in step 6 to the attack of the aluminous mineral.

10. The method as claimed in claim 1 in which the liquor resulting from attack is treated with a liquor containing HCl and $H_2SO_4$ in the presence of the insoluble substances resulting from the sulphuric attack.

11. The method as claimed in claim 1 in which the mineral material to be attacked is selected from the group constituted of the silico-aluminous minerals, the siliceous bauxites, the kaolinic clays, the shales which may contain coal, the impure aluminas and the impure aluminum sulphates resulting from primary processes.

12. The method as claimed in claim 1 in which the mixture of step (1) is maintained at a temperature within the range of 80°–90° C. and at about atmospheric pressure.

13. The method as claimed in claim 1 in which the liquor mixed with the liquid phase in step (1) contains 0.15 to 0.37 kg/liter of HCl and 0.325 to 0.010 kg/liter of $H_2SO_4$.

14. The method as claimed in claim 1 in which the liquor mixed with the liquid phase in step (1) contains 0.15 to 0.30 kg/liter of HCl and 0.325 to 0.260 kg/liter of $H_2SO_4$.

* * * * *